Patented Dec. 22, 1931

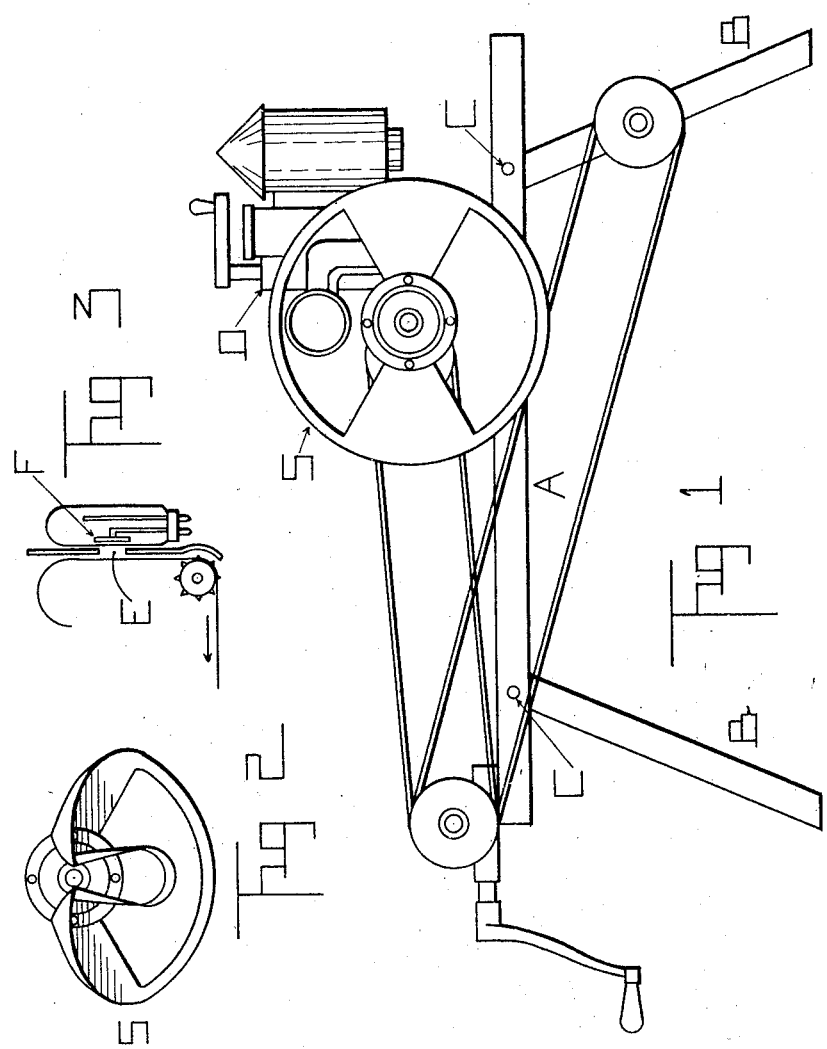

1,837,776

UNITED STATES PATENT OFFICE

CHARLES FRANCIS JENKINS, OF WASHINGTON, DISTRICT OF COLUMBIA, ASSIGNOR TO JENKINS LABORATORIES, OF WASHINGTON, DISTRICT OF COLUMBIA, A CORPORATION OF THE DISTRICT OF COLUMBIA

COLLAPSIBLE SHUTTER FOR PROJECTORS

Application filed November 29, 1927. Serial No. 236,565.

This invention relates to motion picture machines, and has for its principal object the employment of a flexible or pliable shutter for interrupting the projection light employed therewith.

Heretofore all shutters for motion picture projectors have been made of rigid material easily bent and difficult to straighten out again because of the resultant stretch in the metal.

Applicant designed and uses a small, light motion picture projecting machine so made that it can be folded up and put in a small suitcase. For such a projector the usual metal shutter is unsuited.

Therefore, metal shutters were discarded and a shutter of pliable material such as paper, cardboard, celluloid, or the like substituted therefor which is not in any way damaged by being bent, but immediately takes its proper useful shape when put into rotation.

Another object is the employment in this miniature projector of a lamp having a uniform light source of approximately the size and shape of the picture-lighting aperture. This is accomplished by using a short, wide ribbon filament light source in the lamp. This light source may be of the incandescent ribbon type, or it may be of the gaseous glow type.

With these and other objects in view, the invention consists of the novel combination of parts hereinafter disclosed, illustrated in the drawings, and more particularly pointed out in the claims.

In the drawings, Figure 1 is an elevation of the machine; Figure 2 the shutter at rest; and Figure 3 an elevation of the lamp and lighting aperture past which the film moves.

In the figures, like symbols refer to like parts, A being a frame with legs B pivoted at C, and carrying a motion picture projector-head D, with a light aperture therein at E, (Fig. 3). S is the shutter.

When the projector mechanism is fitted with the single-plate light-source F, it is preferably located close to the film aperture, as shown in Figure 3. With a plate cathode (F) in helium gas, or neon gas, and with a trace of mercury vapor therein, the lamp will take the potential of ordinary house lighting current without rheostats or transformers, giving light enough for the purpose, and without appreciable heat, all advantageous features.

The shutter at rest collapses, as shown in Figure 2, and is not damaged by being crowded into small space. When, however, the machine is started centrifugal force holds the shutter out in disc-like form, and in such form serves its purpose perfectly.

What I claim, is—

1. In a motion picture machine the combination of a rotary light interrupting shutter of thin pliable material adapted to be bent without permanent deformation, and means for rotating said shutter to bring all points thereof into substantially a single plane.

2. In a motion picture machine the combination of a rotary light interrupting shutter of thin flexible material forming a non-rigid structure when at rest, and means for rotating said shutter to force it by centrifugal action into substantially a single plane.

3. In combination a circular light interrupting shutter of thin flexible material tending to assume a collapsed position when supported solely at the center, and means for rotating said shutter to cause it centrifugally to assume a substantially single plane.

4. A combination according to claim 3 in which the shutter is provided with two arcuate shaped openings.

In testimony whereof I have affixed my signature.

CHARLES FRANCIS JENKINS.